F. L. WALTER.
FLUID OPERATED GEAR SHIFTING DEVICE.
APPLICATION FILED JAN. 15, 1915.

1,175,097.

Patented Mar. 14, 1916.
4 SHEETS—SHEET 2.

Witnesses
G. H. Walmsley,
H. L. Hammaker,

Inventor
Frank L. Walter,
By
Toulmin Reed & Toulmin
Attorney

UNITED STATES PATENT OFFICE.

FRANK L. WALTER, OF DAYTON, OHIO.

FLUID-OPERATED GEAR-SHIFTING DEVICE.

1,175,097.

Specification of Letters Patent. Patented Mar. 14, 1916.

Application filed January 15, 1915. Serial No. 2,358.

*To all whom it may concern:*

Be it known that I, FRANK L. WALTER, a citizen of the United States, residing at Dayton, in the county of Montgomery and State of Ohio, have invented certain new and useful Improvements in Fluid-Operated Gear-Shifting Devices, of which the following is a specification, reference being had therein to the accompanying drawing.

This invention relates to gear shifting devices, and more particularly to a fluid-operated gear shifting device which is designed specially for use with automobiles and the like, but is capable of use to shift gears or similar devices in connection with any class of machinery.

As is well known, the shifting of the variable speed gears of an automobile is one of the most difficult parts of the operation of the machine, and various attempts have been made to accomplish this by the use of power, and, further, it has been proposed to utilize fluid operated devices for this purpose. As far as these devices have come to my knowledge, however, they have been defective in some respects and have not given satisfaction, one of the difficulties encountered being the failure of the devices to properly neutralize the gears before a shifting operation.

The object of the present invention is to provide a fluid-operated gear shifting device which will be simple in its construction, positive and powerful in its operation, and which will not only shift the gears to give the desired speed, but will automatically neutralize the gears before each shifting operation.

To this end it is a further object of my invention to provide a selecting device to determine the position into which the gear will be shifted by the operation of the fluid-operated device, and a controlling device to control the operation of the fluid-operated device.

A further object of the invention is to so construct the device that it will be very compact in its construction and will have a minimum number of exposed parts which might be broken or disarranged and thus render the device inoperative.

In the accompanying drawings.

In these drawings I have illustrated one embodiment of my invention and have shown the same as designed for use with a variable speed transmission mechanism having three forward speeds and a reverse. These variations in the speed and direction of the movement of the mechanism are secured in a well known manner and require the use of two shiftable transmission devices or gears, each of said shiftable gears being normally in a neutral position and being movable in either direction in order that it may be brought into operative relation with the gear which it is desired to operate. I have, therefore, provided two fluid-operated devices each connected with one of the shiftable gears and each movable in either direction from a central position to shift the particular gear with which it is connected. In addition to these two fluid-operated devices I have provided a third fluid-operated device which is of such a character that it will return either of the shiftable gears to its neutral position from either of its operative positions. In connection with these devices I have provided a selecting valve which can be adjusted by the operator to cause the gearing to be shifted to give the desired speed or direction of movement, and I have also provided a controlling valve, a single movement of which serves to operate the neutralizing device to return both gears to their neutral positions, to exhaust the fluid from this neutralizing device, so that the gears are again free to move in either direction, and to cause the operation of the selected gear shifting device.

Figure 2:
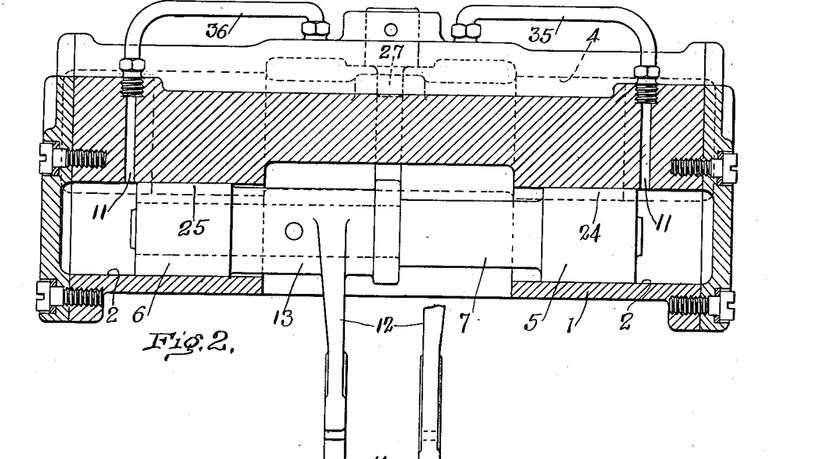
Fig. 2 is a longitudinal section taken through one of the shifting cylinders.
Figure 3:
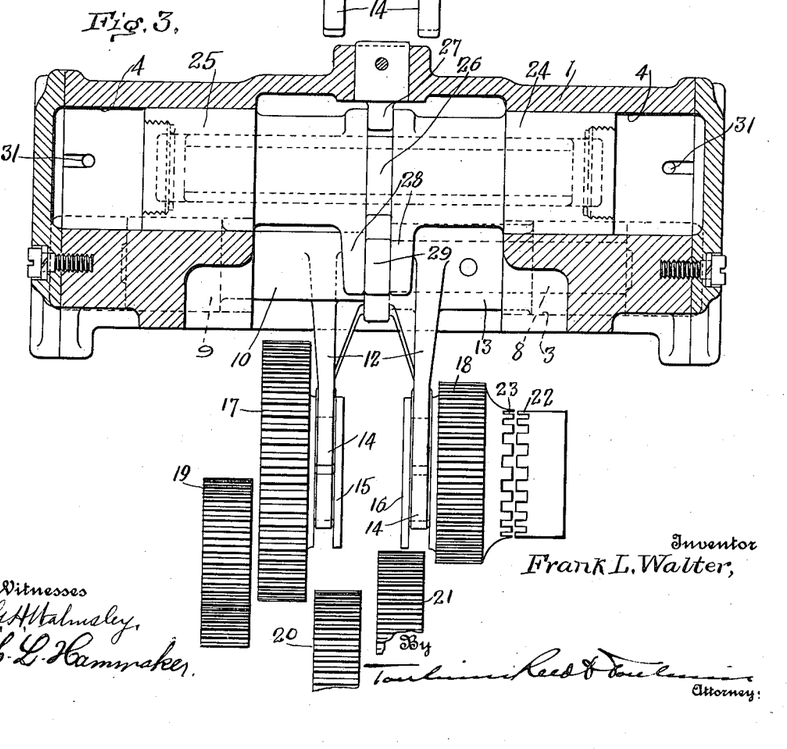
Fig. 3 is a longitudinal sectional view taken through the neutralizing cylinder.

These several features of the invention may be embodied in mechanisms of various kinds, and that herein illustrated has been chosen for the purpose of illustration, as it is the most satisfactory of any so far devised by me. As here shown the mechanism as a whole comprises a casing 1 adapted to be mounted upon the machine in any suitable position, but is preferably located directly above or close to the variable speed mechanism to facilitate the connection of the gear shifting devices with the gears to be shifted. Formed in this casing are three separate and distinct cylinders, as shown at 2, 3 and 4. In the present construction of the mechanism, each of these cylinders is a double cylinder, that is, it comprises two operative portions spaced apart. The cylinders 2 and 3 are the gear shifting cylinders and are exactly alike in their construction. In each cylinder there is mounted a piston which, in this type of mechanism, is a double piston. That piston in the shifting cylinder 2 is provided at its ends with piston heads 5 and 6 operating in the respective operable portions of the cylinder and connected by a reduced portion or connecting rod 7. Likewise the piston in the cylinder 3 has piston heads 8 and 9 arranged in the operative portions of that cylinder and connected by a reduced portion or piston rod 10. The inlet ports for the cylinders 2 and 3 are arranged near the ends thereof, as shown at 11, and each is adapted to serve both as an inlet and as an exhaust for the fluid which operates the piston. The two gear shifting pistons have secured thereto connecting devices for operatively connecting the same with the gear to be shifted. As here shown, these devices consist of arms 12 rigidly secured to the intermediate portions of the respective pistons, preferably by means of sleeves 13, and are provided at their outer ends with yokes 14 adapted to extend into grooved collars 15 and 16 carried by shiftable gears 17 and 18 of the variable speed mechanism. As shown in Fig. 3, these shiftable gears are in their neutral positions. The gear 17 is arranged between the reversing gear 19 and the low speed gear 20, and by movement in the proper direction can be caused to mesh with either of these gears. The gear 18 is arranged between an intermediate speed gear 21 and a high speed gear or clutch 22. When moved in one direction, the exterior teeth of the gear 18 will mesh with the intermediate gear 21. When moved in the other direction a clutch member 23 will engage the clutch member 22 on the driven device, which is usually the driving shaft. The construction of the variable speed mechanism and the movements of the gears are of a well known character and further description or illustration is not deemed necessary. It is obvious that when the air is admitted into one end of one of the cylinders, for instance, the right hand end of the cylinder 2 in Fig. 2, the piston will be moved toward the left and the gear with which it is connected, that is, the gear 18, will be moved to the left, thereby causing this gear to mesh with the intermediate speed gear 21. If the air be admitted at the left hand end of the cylinder 2 the gear 18 will be moved in the opposite direction and caused to connect with the high speed clutch.

The third cylinder 4 is a neutralizing cylinder, and, like the cylinders 2 and 3, is a double cylinder having an operative portion at each end thereof. Mounted in this cylinder is a double piston comprising piston heads 24 and 25, operative in the respective portions of the cylinder. This double piston differs from the double pistons in cylinders 2 and 3 in that the two parts, 24 and 25, thereof are separately movable, these parts being mounted on and guided by a central rod or shaft 26. A stud 27 is secured to the top wall of the casing and forms a stop to limit the inward movement of the two parts of the piston. Each part of the piston is provided with a depending lug 28, the two lugs being arranged on opposite sides of lugs 29 and 30 carried by the respective pistons in the cylinders 2 and 3, extending inward and arranged in transverse alinement one with the other. Hence, it will be apparent, that any movement of either of the gear shifting pistons will cause one of the neutralizing pistons 24 or 25 to be moved toward the end of the cylinder 4, and that this movement will not affect the other neutralizing piston or the other gear shifting piston. The neutralizing cylinder is provided with inlet ports 31 arranged near its opposite ends, which ports also serve as exhaust ports. The admission of the air to the cylinder 4 through the ports 31 serves to force the neutralizing piston, which has been displaced, to its normal or neutral position, thereby moving the gear shifting piston and the gear, which have been moved, into their neutral positions. As more power is required to disengage the gears than to engage them, I have made the neutralizing cylinder of larger diameter than the shifting cylinders, but this is a matter of practice and the relative sizes of the cylinders may be varied to accommodate the device to any particular mechanism with which it is to be connected.

Figure 1:
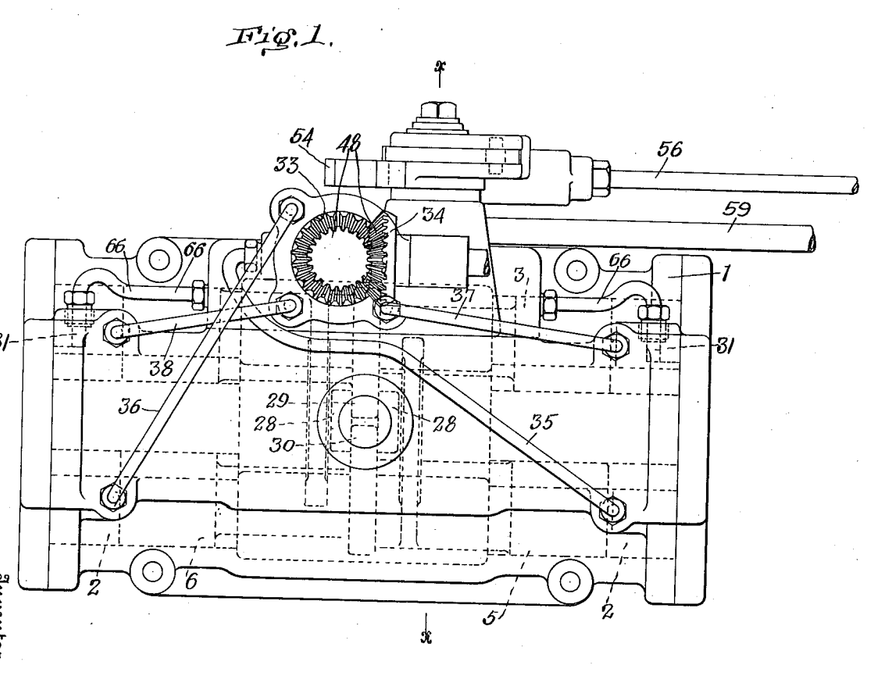
Figure 1 is a top plan view of a mechanism embodying my invention.

To enable the operator to determine which shifting piston will be operated, and in which direction it will be moved, I have provided a selecting valve which is here shown in the form of a turn-plug valve member 32 mounted in a valve chamber 33 which is formed in a valve casing 34, mounted upon the main casing 1. The valve chamber 33 is connected with the opposite ends of the cylinder 2 by means of conduits 35 and 36 and with the opposite ends of the cylinder 3 by conduits 37 and 38, these conduits communicating with the respective cylinders through the inlet ports 11. In the present arrangement of the selecting valve the conduits 35, 36, 37 and 38 communicate with the valve chamber through ports, forming parts of the conduits, arranged circumferentially about the periphery of the chamber in the same transverse plane and spaced apart. The turn-plug valve is provided with a radial port 39 adapted to be moved into registration with any one of the conduits 35, 36, 37 and 38, and communicating at its inner end with a vertical conduit or port 40. This vertical port is formed centrally of the turn-plug valve and communicates at its lower end with one or more radial ports 41, each terminating at its outer end in an annular groove 42 which extends about the periphery of the valve member and is in constant communication with a port 43 leading to a source of supply for fluid under pressure. Thus, it will be apparent, that when the valve member is turned to bring the port 39 into registration with any one of the conduits leading to the gear shifting cylinders this conduit, which has been selected, will be connected by the ports 39, 40, 41 and groove 42 with the port or conduit 43 leading to the source of fluid supply. The valve is so arranged that when the port 39 is in registration with any one of the conduits leading to the shifting cylinders, the other conduits will be connected with an exhaust port. This may be accomplished by separate ports, but I prefer to provide the valve member with a circumferential groove or port 44 of such a length and so arranged with reference to the port 39 that when the port 39 is in alinement with any one of the ports 35, 36, 37 or 38, the groove 44 will be in registration with the other three of said ports and will connect the same with an exhaust passage 45 formed in the valve member, preferably extending through the upper end thereof. This selecting valve may be controlled by the operator in any suitable manner, preferably a controlling handle, such as is shown at 46, is mounted on the steering post and arranged to move over a guide plate or segment 47 having indications to guide the operator in the setting of the valve. This handle is connected with the valve member by any suitable mechanism, such as a series of rods and beveled gearing, as indicated at 48. It is not desirable, however, that the adjustment of the setting valve should in itself cause the operation of the shifting cylinders, and I have, therefore, provided a second valve to control the flow of fluid through the port 43 to the selecting valve. In the present form of the mechanism, this controlling valve is also in the nature of a turn-plug valve, as shown at 49, and is rotatably mounted in a valve chamber 50 which is shown as formed in the same casing 34 with the valve chamber 33 and, further, the chamber 50 is shown as arranged at right angles to the chamber 33 although this arrangement is not essential to the operation of the device. This controlling valve not only controls the flow of fluid to the distributing or selecting valve, but it also controls the flow of fluid to the neutralizing cylinder, and is so constructed that when operated by the driver or other operator it will cause the gears to be neutralized before admitting fluid to the selecting valve. Preferably, the controlling valve is operatively connected with a clutch pedal, which is shown at 51, and this connection is so arranged that each operation of the pedal will move the controlling valve one-third of a complete rotation, and, for this reason, the valve is here shown as provided with three series of ports, each of which is brought in turn into operation. The connection between the clutch pedal 51 and the valve 49 as here shown consists of a ratchet wheel 52 secured to the stem of the valve and adapted to be engaged by a pawl 53 carried by a gear 54 mounted on the axis of said ratchet and meshing with a segment 55 which segment is connected by means of a rod 56 with the clutch pedal 51. As shown, the valve member 49 is provided near one end with an annular groove 57 communicating with an inlet port 58 which in turn is connected by conduits 59 (see Fig. 1) and 69 with a source of supply for fluid under pressure.

Figures 4, 5, 6, 7, 8, 9:
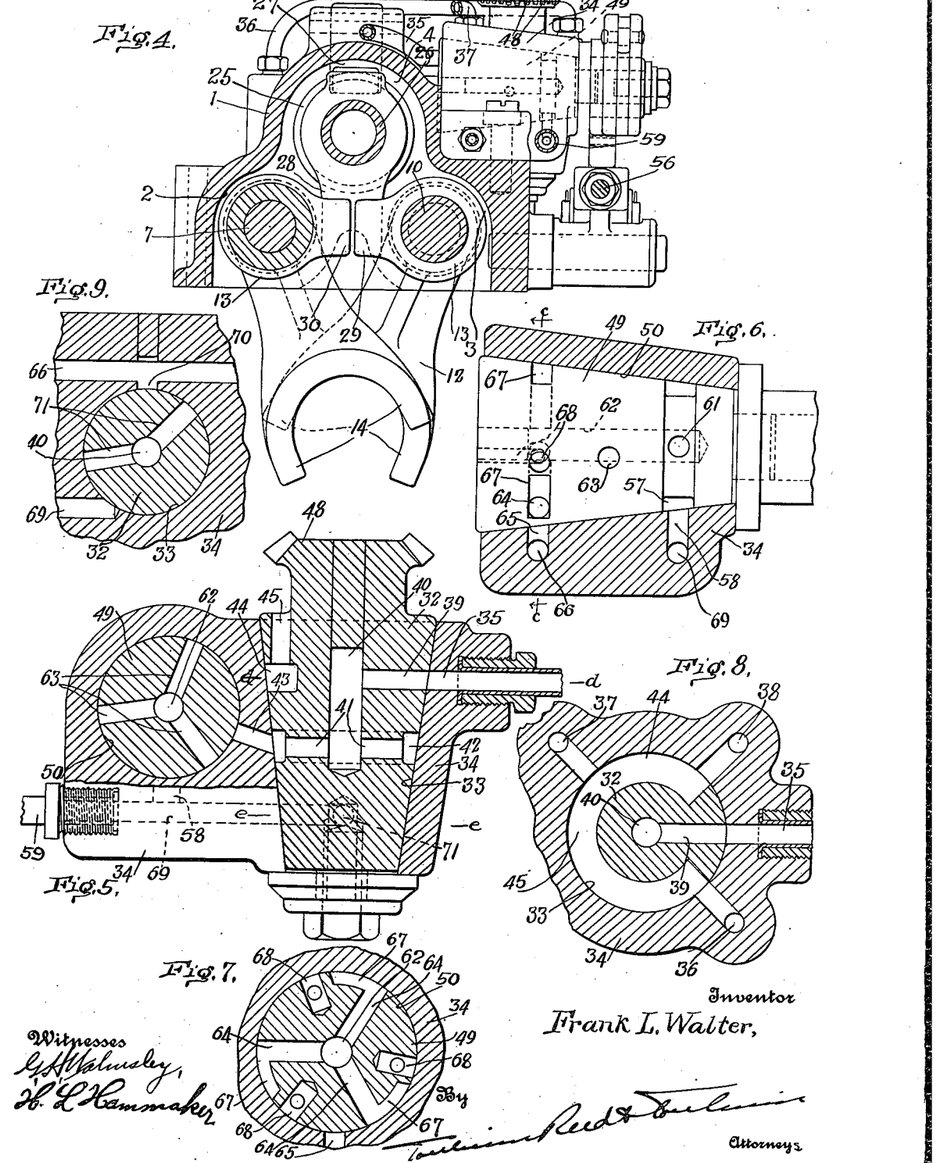
Fig. 4 is a transverse sectional view taken on the line $x$ $x$ of Fig. 1, showing the controlling valve in elevation.
Fig. 5 is a sectional detail view of the selecting and controlling valves.
Fig. 6 is a longitudinal sectional view, partly in elevation, of the controlling valve.
Fig. 7 is a transverse sectional view of the controlling valve taken on the line $c$ $c$ of Fig. 6, looking in the direction of the arrow.
Fig. 8 is a transverse sectional view of the selecting valve taken on the line $d$ $d$ of Fig. 5.
Fig. 9 is a transverse sectional view of the selecting valve taken on the line $e$ $e$ of Fig. 5.
Figures 10, 11, 12, 13:
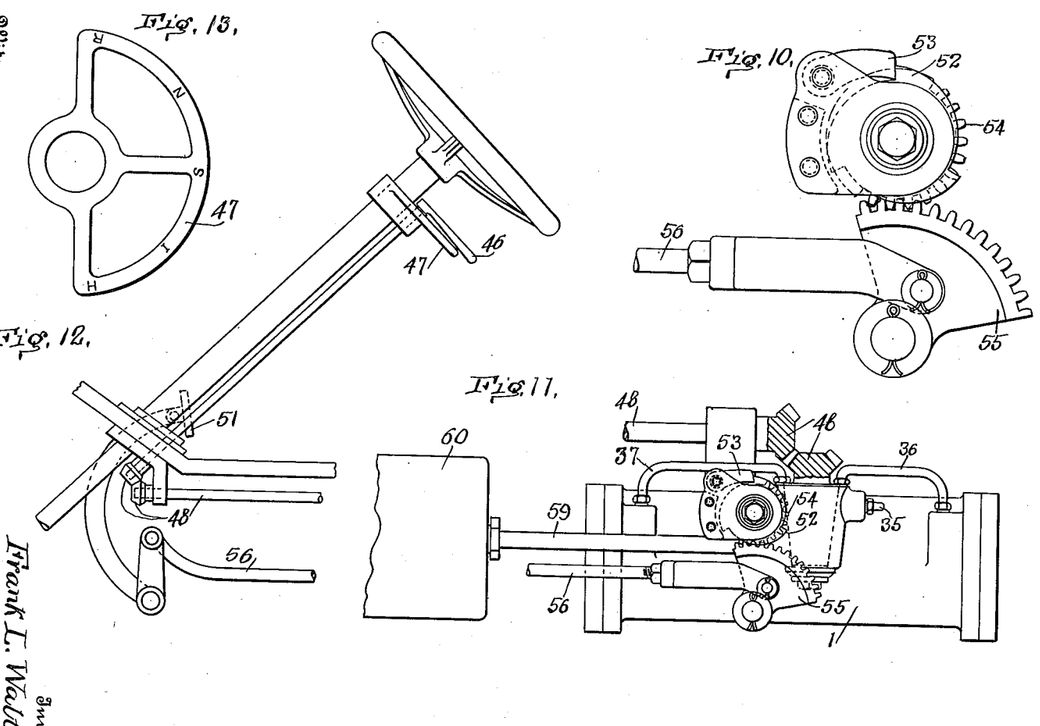
Fig. 10 is a detail view of the valve-actuating device.
Fig. 11 is a side elevation of the gear-shifting device.
Fig. 12 is a detail view of a portion of an automobile showing the operating mechanism for the gear-shifting device.
Fig. 13 is a detail view of the selecting segment.

Any suitable fluid may be utilized in the operation of the mechanism but I prefer to use air, as this can be readily compressed and stored in a suitable receptacle on the machine. I have here shown the source of supply as a conventional tank 60, but have not illustrated any means of compressing the air in the tank, as this forms no part of the invention and may be accomplished in any suitable manner. The annular groove 57 in the valve member 49 is connected by one or more ports 61 with a central port or conduit 62 closed at its upper and lower ends. The valve member 49 is provided with a series of three radial ports 63 communicating with the central port 62 and adapted to be moved into alinement with the supply port 43 leading to the selecting valve. The valve is also provided with a second series of three radial ports 64 arranged to connect the central port 62 with a port 65 leading to a conduit 66 which communicates with both ends of the neutralizing cylinder 4. As has been explained, these ports are arranged in series of three, because, in the present arrangement of the mechanism, the valve makes one-third of a rotation on each operation of the mechanism. Obviously, the number of ports provided may be varied without affecting the result. The valve member 49 is arranged to rotate clockwise, and the arrangement of the ports 63 and 64 relatively to the conduits 43 and 65 is such that the first portion of the movement of the valve will bring one of the ports 64 into registration with the port 65, thereby admitting fluid to the neutralizing cylinder and moving both pistons of that cylinder to their central or neutral positions. As the movement of the valve is continuous, I prefer to provide each of the ports 64 with an extension 67 arranged circumferentially of the valve member and serving to maintain the port 65 in communication with the central port 62 for a longer period of time, thereby insuring an ample supply of air to operate the neutralizing piston. Inasmuch as the neutralizing pistons must be free to move upon the operation of the shifting pistons, I have provided a series of exhaust ports 68 arranged just beyond the extensions to the port 64 and adapted to register with the neutralizing port 65 immediately after the port 64 and its extension have passed beyond the same, thus causing the air to be exhausted from the neutralizing cylinder immediately after the piston or pistons have been moved to their neutral positions. The arrangement of the port 63 with relation to the corresponding exhaust port 68 is such that the port 63 will be moved into registration with the port 43 either simultaneously with the movement of the exhaust port 68 into registration with the neutralizing port 65 or immediately after the port 68 is moved into registration with the port 65, it only being necessary that the port 63 should not be moved into registration with the port 43, to cause the operation of the selected gear shifting device, before the exhaust port 68 is moved into registration with the neutralizing port 65. It will be noted, therefore, that before this connection can be made, the gears must be neutralized and the neutralizing cylinder must be exhausted to permit of the movement of one of the neutralizing pistons when the selected gear shifting piston is actuated.

It is also desirable that means should be provided for neutralizing the gears without the operation of the gear shifting piston, so as to leave the gears in neutral positions when the machine is stopped. To this end the selecting valve 32 is also provided with ports for connecting the source of supply with the neutralizing conduit 66. To this end the lower portion of the valve casing 34 is provided with an inlet port 69 connected with the source of fluid supply and leading to the valve chamber 33, and with a second port 70 leading from the valve chamber 33 to the neutralizing conduit 66. The valve member 32 is provided with a port or ports 71 arranged to be moved simultaneously into registration with the inlet port 69 and the neutralizing port 70. This port 71 is so arranged that it will be moved into a position to connect the neutralizing cylinder with the source of supply when the valve member 32 is in such a position that the port 39 will not register with any one of the ports 35, 36, 37 or 38, and the guide plate for the operating handle is provided with an indication for this position of the valve. It will be noted that the port 69 is permanently connected with the source of fluid supply regardless of the position of the controlling valve, and, therefore, it is not necessary to operate the controlling valve to neutralize the gears.

The operation of the mechanism will be readily understood from the foregoing description, and it will be apparent that I have provided a fluid operated mechanism which will be actuated by the operation of the clutch pedal to neutralize the transmission gearing and to shift the same to a new position, and that this new position is controlled by the operator through the selecting device, and, further, that the selecting device can be adjusted to the desired position without causing any movement of the gear shifting devices, thereby allowing the operator to select the next position of the gears and then to cause the gears to be shifted at any time he sees fit to do so. Further, it will be apparent, that the device is of a very simple compact construction; that both the operating and controlling devices are of a very strong, durable construction; that there are no parts which can be easily disarranged or rendered inoperative; and that the device is of such a character that it can be manufactured at a comparatively low cost.

While I have illustrated one embodiment of my invention, I wish it to be understood that I do not desire to be limited to the details of construction shown and described, as obvious modifications will occur to a person skilled in the art.

Having thus fully described my invention, what I claim is new and desire to secure by Letters Patent, is:

1. The combination, with a gear having a neutral position and movable into any one of a plurality of operable positions, of fluid-operated mechanism to actuate said gear to move the same into one of said operable positions, mechanism in engagement with said fluid-operated mechanism to move the same to shift the gear to neutral position if in another of said operable positions before said gear is again shifted to the other one of said operable positions by said fluid-operated mechanism, and means to cause the actuation of said mechanisms.

2. The combination, with a plurality of gears having neutral positions and movable into operative positions, of fluid operated mechanism to actuate said gears, and means operable in one direction to first cause said fluid-operated mechanism to move into its neutral position any gear which may be in an operative position and then cause a gear to move into an operative position.

3. The combination, with a gear having a neutral position and movable into any one of a plurality of operable positions, a fluid-operated mechanism to move said gear into a selected one of said operative positions and to return said gear to its neutral position, and a controlling valve the movement of which in one direction will cause said mechanism to move said gear first into said neutral position and then into a selected operative position.

4. The combination, with a gear having a neutral position and movable into any one of a plurality of operable positions, fluid operated mechanism to move said gear into a selected one of said operative positions and to return said gear to its neutral position, a controlling valve to cause said fluid-operated mechanism to first move said gear to its neutral position and to then move the same into an operative position, and a selecting valve to determine the particular operative position into which said gear is to be moved.

5. The combination, with a gear having a neutral position and movable into any one of a plurality of operable positions, fluid-operated mechanism to move said gear into a selected one of said operative positions and to return said gear to its neutral position, a selecting valve to determine the particular operative position into which said gear is to be moved, and a valve to control the admission of fluid to said fluid operated mechanism.

6. The combination, with a plurality of gears having neutral positions and movable into operative positions, of fluid operated mechanism to actuate said gears, a selecting valve to determine the movements of said gears, and a controlling valve to cause the operation of said fluid operated mechanism, said controlling valve having means to cause said fluid operated mechanism to move into a neutral position any gear which may be in an operative position before any gear can be moved into its operative position.

7. The combination with a gear having a neutral position and movable into an operative position, of a fluid-operated device to move said gear into its operative position, and a second fluid-operated device to move said gear into its neutral position.

8. The combination with a gear having a neutral position and movable into an operative position, of a fluid-operated device to move said gear into an operative position, and a second fluid-operated device to move said gear into its neutral position, and a controlling device to cause said fluid-operated devices to actuate on said gear in succession.

9. The combination with a gear having in a neutral position and movable into any one of a plurality of operative positions, of a fluid-operated device to move said gear into a selected one of said operative positions, a selecting device to control said movement, a second fluid-operated device to move said gear into its neutral position and a device to cause said second fluid-operated device to act on said gear and to cause said first-mentioned device to move said gear into said selected position.

10. The combination with a gear having a neutral position and movable into any one of a plurality of operative positions, of a cylinder, a piston mounted in said cylinder and operatively connected with said gear, a second cylinder and a piston mounted in said second cylinder and having means to return said gear to its neutral position.

11. The combination with a gear having a neutral position and movable into any one of a plurality of operative positions, of a cylinder, a piston mounted in said cylinder and operatively connected with said gear, a second cylinder, a piston mounted in said cylinder and a connection between said last-mentioned piston and the first-mentioned piston to return said first-mentioned piston and the gear which is connected thereto to their normal positions.

12. The combination with a gear having a neutral position and movable into any one of a plurality of operative positions, of a cylinder, a piston mounted therein, operatively connected with said gear and having a laterally extending lug, a second cylinder and a piston mounted in said second cylinder and having a lug coöperating with the first-mentioned lug to return said first-mentioned piston to its normal position.

13. The combination with a gear having a neutral position and movable into any one of a plurality of operative positions, of a cylinder, a piston mounted in said cylinder to move it in either direction, a connection between said piston and said gear, a second cylinder and a two-part piston mounted in said cylinder, the first-mentioned piston having a projection and the two parts of said last-mentioned piston having portions extending on opposite sides of said projection whereby one part of said piston will be moved out of its normal position by the movement of the first-mentioned piston in either direction.

14. The combination with a gear having a neutral position and movable into any one of a plurality of operative positions, of a cylinder, a piston mounted in said cylinder to move it in either direction, a connection between said piston and said gear, a second cylinder and a two-part piston mounted in said cylinder, the first-mentioned piston having a projection and the two parts of said last-mentioned piston having portions extending on opposite sides of said projection whereby one part of said piston will be moved out of its normal position by the movement of the first-mentioned piston in either direction, and means to admit fluid under pressure to said second cylinder and then to said first cylinder.

15. The combination with a gear having a neutral position and movable into any one of a plurality of operative positions, of a cylinder, a piston mounted therein and connected with said gear, a second cylinder, a piston mounted therein and connected with said gear, and a device to control the flow of fluid to said cylinders and to cause fluid to be admitted to said second cylinder, to cause said fluid to be exhausted from said second cylinder and to cause fluid to be admitted to the first-mentioned cylinder.

16. The combination with a plurality of gears having neutral positions and each movable into two or more operative positions, of a pair of fluid cylinders, pistons mounted in said cylinders and connected with the respective gears, and each being capable of two movements to move the respective gears into either one of their operative positions, and a fluid-operated neutralizing device to move either of said gears from either of its operative positions to its neutral position.

17. The combination with a plurality of gears having neutral positions and each movable into two or more operative positions, of a pair of fluid cylinders, pistons mounted in said cylinders and connected with the respective gears, each piston being arranged normally in a central position and capable of movement in either direction from said central position, whereby either of said gears may be moved into a selected operative position, a fluid-operated neutralizing device arranged to be moved from its normal position by the movement of either piston in either direction, and means to admit fluid to said neutralizing device to return it to its normal position, thereby returning that piston which has been actuated to its central position and neutralizing the gear which has been moved into its operative position.

18. The combination with a plurality of gears having neutral positions and each movable into two or more operative positions, of a pair of fluid cylinders, pistons mounted in said cylinders and connected with the respective gears, each piston being arranged normally in a central position and capable of movement in either direction from said central position, whereby either of said gears may be moved into a selected operative position, a neutralizing cylinder comprising two parts, each of which has an inlet near one end thereof, a piston mounted in each part of said cylinder and having an operative connection with said first-mentioned pistons, whereby the movement of either of said pistons in either direction will move one of said neutralizing pistons toward the end of said cylinder, and means for admitting fluid under pressure to said neutralizing cylinder to return the neutralizing piston and the first-mentioned piston to their normal positions.

19. The combination with a plurality of gears having neutral positions and each movable into two or more operative positions, two gear shifting cylinders, a double piston mounted in each of said cylinders and connected with the respective gears, each of said pistons having a laterally extending lug between the two parts thereof, a neutralizing cylinder and separately movable pistons mounted in said cylinder, said separately movable pistons having lugs arranged on opposite sides of the first-mentioned lugs whereby the movement of either of the first-mentioned pistons in either direction will displace one of said neutralizing pistons, and means for admitting fluid under pressure to said neutralizing cylinder to return that piston which has been displaced to its normal position, thereby neutralizing the gear connected with the gear shifting piston which has been actuated.

20. The combination with a plurality of gears having neutral positions and each movable into two or more operative positions, two gear shifting cylinders, a double piston mounted in each of said cylinders and connected with the respective gears, each of said pistons having a laterally extending lug between the two parts thereof, a neutralizing cylinder and separately movable pistons mounted in said cylinder, said separately movable pistons having lugs arranged on opposite sides of the first-mentioned lugs whereby the movement of either of the first-mentioned pistons in either direction will displace one of said neutralizing pistons, each of said cylinders being connected beyond the ends of the several pistons with a source of supply for fluid under pressure, and a controlling device, a single operation of which will admit fluid to said neutralizing cylinder, exhaust the fluid from said neutralizing cylinder and admit fluid to one of said gear shifting cylinders.

21. The combination with a gear having a neutral position and movable into any one of a plurality of operative positions, of fluid-operated mechanism to move said gear into a selected one of said operative positions and to return said gear to its neutral position, a controlling device to cause said fluid-operated mechanism to first move said gear to its neutral position and then move the same into an operative position, and a selective device to determine the operative position into which said gear is to be moved.

22. The combination with a gear having a neutral position and movable into any one of a plurality of operative positions, of a fluid cylinder, a piston mounted in said cylinder and operatively connected with said gear to move the same into either of its operative positions, a selecting valve to control the admission of fluid to said cylinder and determine into which position said gear is to be moved, a second cylinder, a piston mounted in said second cylinder and having operative connection with said gear, and a controlling valve to cause the fluid to enter said second cylinder before it is admitted to said selecting valve.

23. The combination with a gear having a neutral position and movable into any one of a plurality of operative positions, of a cylinder having an inlet port at each end thereof, a piston mounted in said cylinder and connected with said gear, a second cylinder, the second cylinder also having inlet ports at the opposite ends thereof, separate pistons mounted in the opposite ends of said last-mentioned cylinder, and each of said pistons having a part coöperating with a part carried by the first-mentioned piston, a controlling valve to cause fluid to be admitted to said last-mentioned cylinder, to cause the fluid to be exhausted from the same, and to cause fluid to be admitted to the first-mentioned cylinder, and a selecting valve, adjustable to determine into which end of said first-mentioned cylinder the fluid shall be admitted.

24. In a valve shifting device, the combination with a cylinder having a plurality of inlet ports, a piston mounted therein, a second cylinder also having a plurality of inlet ports, pistons mounted in said second cylinder and having parts coöperating with a part of the first-mentioned piston, of a selecting valve adapted to communicate with a source of fluid supply and having a port, said valve being adjustable to connect said port with either of the inlet ports of the first-mentioned cylinder, a controlling valve interposed between said selecting valve and its source of fluid supply, and having ports arranged to successively connect said source of fluid supply with said last-mentioned cylinder and with said selecting valve.

25. The combination with a fluid-operated gear shifting device and a fluid-operated neutralizing device, of a selecting valve comprising a casing having a plurality of ports leading to different parts of said gear shifting device to cause different operations thereof, and also having a port adapted to be connected with a source of fluid supply, said selecting valve also comprising a movable member having a port normally connected with the last-mentioned port of said casing and adapted to be moved into registration with any one of the first-mentioned ports in said casing, said movable member also having an exhaust port arranged to be connected with the ports leading to said fluid-actuated device when said ports are out of registration with the first-mentioned port of said movable valve member.

26. The combination with a fluid-operated gear shifting device and a fluid-operated neutralizing device, of a casing having two valve chambers, a port connecting said valve chambers, one of said valve chambers having ports leading to said valve shifting device, the other of said valve chambers having a port leading to said neutralizing device and also having an inlet port, a rotatable valve member mounted in the first-mentioned chamber to connect any one of the ports leading to said gear shifting device with the port leading to the other valve chamber, and a rotatable valve member mounted in said second valve chamber and arranged to successively connect said inlet port with ports leading to said neutralizing device and to the first-mentioned valve chamber.

27. The combination with a fluid-operated gear shifting device and a fluid-operated neutralizing device, of a controlling valve comprising a valve chamber connected with a source of fluid supply and having a port leading to said neutralizing device, and another port leading to said gear shifting device, said controlling valve also comprising a rotatable valve member having a port adapted to be moved into registration with the port leading to said neutralizing device, said valve member also having an exhaust port adapted to be moved into registration with the port leading to said neutralizing device, and said valve member also having a third port adapted to be moved into registration with the port leading to said gear shifting device, the first and second ports being connected with said source of fluid supply, and a selecting valve interposed between said controlling valve and said gear shifting device.

28. The combination with a fluid-operated gear shifting device and a fluid-operated neutralizing device, of a controlling valve comprising a casing having a valve chamber, an inlet port leading to said chamber, a port leading from said chamber to said valve shifting device, and a third port leading from said chamber to said neutralizing device, a rotatable valve member mounted in said valve chamber and having a longitudinal conduit, an annular groove registering with said inlet port and connected with said longitudinal conduit, said valve member also having a port communicating with said longitudinal conduit, adapted to be moved into registration with the port leading to said neutralizing device, said valve member also having an exhaust port adapted to be moved into registration with said neutralizing port, said valve member also having a port communicating with said longitudinal port and arranged to be moved into registration with the port leading to said valve shifting device, means for actuating said valve to cause said ports to be brought into registration in the order named, and a selecting device interposed between said valve chamber and said valve shifting device.

29. The combination with a fluid-operated gear shifting device and a fluid-operated neutralizing device, of a controlling valve comprising a casing having a valve chamber, an inlet port leading to said chamber, a port leading from said chamber to said valve shifting device, and a third port leading from said chamber to said neutralizing device, a rotatable valve member mounted in said valve chamber and having a longitudinal conduit, an annular groove registering with said inlet port and connected with said longitudinal conduit, said valve member also having a port communicating with said longitudinal conduit, and adapted to be moved into registration with the port leading to said neutralizing device, said valve member also having an exhaust port adapted to be moved into registration with said neutralizing port, said valve member also having a port communicating with said longitudinal port and arranged to be moved into registration with the port leading to said valve shifting device, means for actuating said valve to cause said ports to be brought into registration in the order named, and a selecting device interposed between said valve chamber and said valve shifting device, said selecting valve having means for connecting said source of supply with said neutralizing device independently of said controlling valve.

30. In an automobile, the combination with a clutch operating device and a variable speed transmission mechanism comprising a movable gear, of a fluid-operated gear shifting device connected with said movable gear and a fluid-operated neutralizing device connected with said gear, and a source of supply for fluid under pressure connected with said gear shifting device and said neutralizing device, a selecting valve to control the flow of fluid to said gear shifting device, an adjusting device for said selecting valve arranged near the operator's position in said automobile, a controlling valve to control the flow of fluid to said neutralizing device and to said selecting valve, and an operative connection between said controlling valve and said clutch operating device.

31. In an automobile, the combination with a clutch operating device and a variable speed transmission mechanism comprising a movable gear, of a fluid-operated gear shifting device connected with said movable gear and a fluid-operated neutralizing device connected with said gear, and a source of supply for fluid under pressure connected with said gear shifting device and said neutralizing device, a selecting valve to control the flow of fluid to said gear shifting device, an adjusting device for said selecting valve arranged near the operator's position in said automobile, a controlling valve to control the flow of fluid to said neutralizing device and to said selecting valve, and an operative connection between said controlling valve and said clutch operating device, said selecting valve having means controlled by said adjusting device for connecting said neutralizing device with said source of fluid supply independently of said controlling valve.

32. In a device of the character described, a casing having three cylinders, one of said cylinders being arranged above and between the axes of the other two cylinders, pistons mounted in the respective cylinders, said pistons having coöperating parts whereby the piston in the upper cylinder may act upon either of the pistons in the lower cylinders, means for connecting said lower pistons with the gear to be shifted, and selecting and controlling valves mounted on said casing to control the admission of operating fluid to said cylinders.

33. The combination, with a plurality of gears having neutral positions and movable into operative positions, each gear having a fluid operated mechanism to move it into any one of its operative positions, of fluid-operated mechanism common to the first-mentioned fluid-operated mechanisms to return the gears to a neutral position.

In testimony whereof, I affix my signature in presence of two witnesses.

FRANK L. WALTER.

Witnesses:
EDWARD S. REED,
F. W. SCHAEFER.